(12) United States Patent
Roessner et al.

(10) Patent No.: US 6,925,756 B2
(45) Date of Patent: Aug. 9, 2005

(54) APPARATUS FOR CONTROLLING THE INGRESS AND EGRESS TO AND FROM AN OPERATOR'S COMPARTMENT

(75) Inventors: Bernd Roessner, Rosengarten (DE); Wilfried Sprenger, Harsefeld-Issendorf (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/358,408

(22) Filed: Feb. 4, 2003

(65) Prior Publication Data

US 2003/0146347 A1 Aug. 7, 2003

(30) Foreign Application Priority Data

Feb. 5, 2002 (DE) ......................................... 102 04 544

(51) Int. Cl.$^7$ .............................................. E05D 15/02
(52) U.S. Cl. ...................... 49/42; 244/129.4; 244/129.5
(58) Field of Search .................... 49/41, 42; 244/129.4, 244/129.5; 109/48, 49, 64, 73, 59 T, 8–13

(56) References Cited

U.S. PATENT DOCUMENTS

| | | | | |
|---|---|---|---|---|
| 3,658,277 A | * | 4/1972 | Anderson | .................... 244/1 R |
| 3,828,490 A | * | 8/1974 | Duquette | ..................... 52/2.14 |
| 4,159,171 A | * | 6/1979 | Nineberg | ..................... 396/589 |
| 6,470,512 B1 | * | 10/2002 | Lau et al. | ....................... 4/612 |
| 2002/0158166 A1 | | 10/2002 | Lin | |
| 2003/0047648 A1 | | 3/2003 | Batt et al. | |
| 2003/0052225 A1 | | 3/2003 | Butzlaff | |
| 2003/0052227 A1 | | 3/2003 | Pittman | |
| 2003/0052779 A1 | | 3/2003 | Martin et al. | |

FOREIGN PATENT DOCUMENTS

GB  2263130 A  *  7/1993  ............. E05G/5/00

* cited by examiner

*Primary Examiner*—Jerry Redman
(74) *Attorney, Agent, or Firm*—W. F. Fasse; W. G. Fasse

(57) ABSTRACT

The ingress to and egress from an access restricted compartment, such as the cockpit in an aircraft, is controlled by a revolving gate (1) rotatably mounted in a stationary gate frame (2). The revolving gate (1) has a single gate opening (11) and is rotatable about its central longitudinal axis through predetermined or preselected angular sectors to bring the gate opening (11) either into alignment with any one opening (21) of at least two frame openings (21) at a time, to provide ingress or egress, or to cause said single gate opening (11) to face a wall (2A) of said stationary gate frame (2) or a closed door (51) in said stationary gate frame (2) to close the gate (1). In the closed position of the gate (1) escape from the gate (1) is prevented by locking the gate in its closed position by at least one arresting bolt that is electrically controllable. The atmosphere in the revolving gate (1) is also controllable for incapacitating any unauthorized intruder.

17 Claims, 5 Drawing Sheets

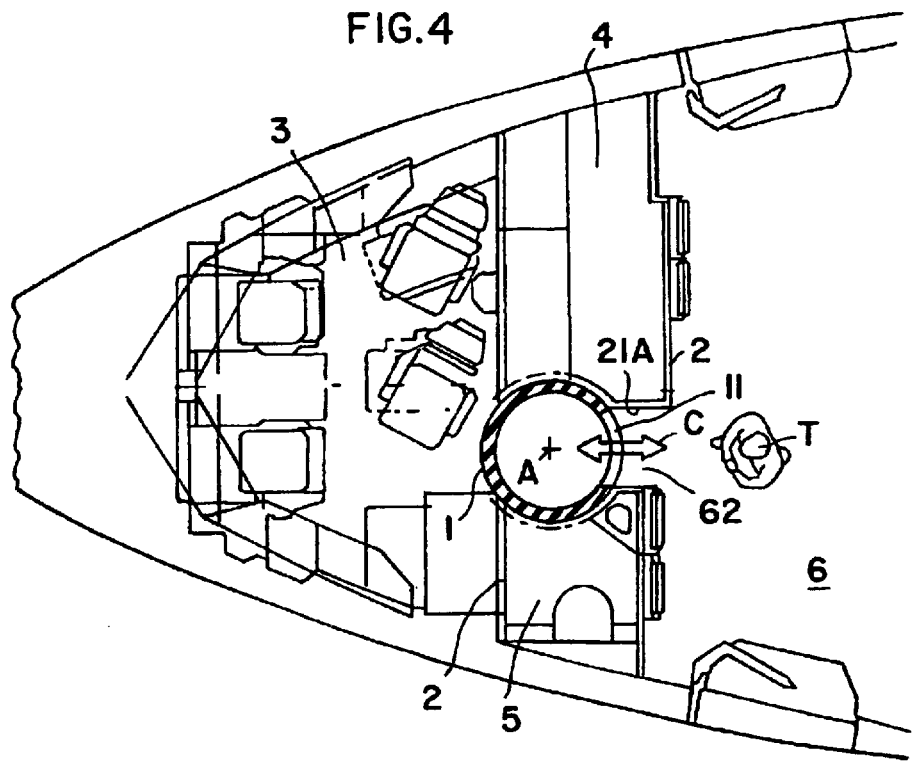
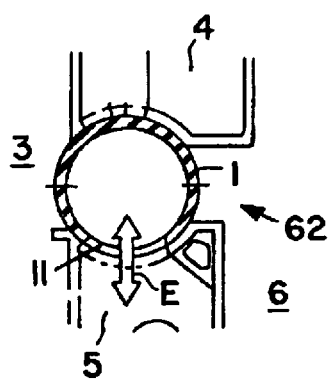
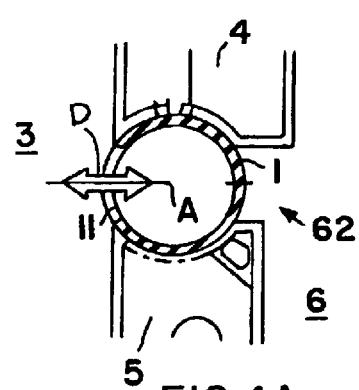
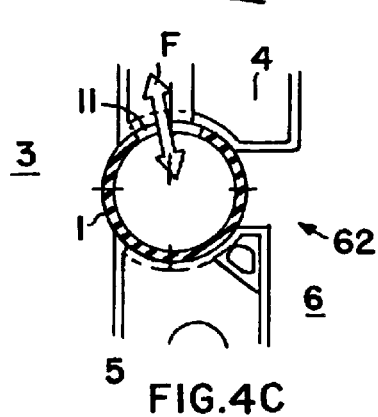
FIG.4 / FIG.4B / FIG.4A / FIG.4C

APPARATUS FOR CONTROLLING THE INGRESS AND EGRESS TO AND FROM AN OPERATOR'S COMPARTMENT

PRIORITY CLAIM

This application is based on and claims the priority under 35 U.S.C. §119 of German Patent Application 102 04 544.5, filed on Feb. 5, 2002, the entire disclosure of which is incorporated herein by reference.

FIELD OF THE INVENTION

The invention relates to an apparatus that will prevent an access of an unauthorized person into an operator's compartment, such as an aircraft cockpit, particularly in a passenger aircraft.

BACKGROUND INFORMATION

The term "cockpit" as used in the present disclosure is intended to encompass not only a cockpit in an aircraft, but also a driver's cab in a train, a bridge on a ship, and any compartment in which an operator has the ability of controlling the operation of a vehicle.

Recently the danger of aggressive acts by persons in an aircraft has increased, particularly in commercial passenger aircraft. Such aggressive acts including terrorizing acts and hijacking attempts, endanger not only individual passengers, but the entire aircraft with all persons on board. Already the possibility of an uncontrolled access by unauthorized persons into the cockpit can endanger the safety of the operation and the life of the passengers. This danger occurs not only in aircraft, but also in the unauthorized operation of public transportation vehicles such as trains, buses, ships, ferries and the like. In all these instances the passengers and crew are endangered. In practice, the danger situation always becomes critical where there are no suitable countermeasures to prevent an intruder from gaining access to the controls in the cockpit.

For an improved protection of the cockpit it is, for example known to make the doors into the cockpit in an aircraft of bulletproof materials. Such a feature provides an increased passive protection. However, bulletproof doors do not provide any possibility for actively fighting an intruder or at least to eliminate the intruder's ability to cause damage.

It is known, for example in banks and other security critical buildings or facilities to provide access through a security passage which encloses a closeable and lockable space that prevents entry into a critical area in response to certain criteria. A security passage has the advantage that a person or persons in the passage can be observed prior to being admitted into the critical area. The observation may be visual by a guard, or by a camera and display in a controlled area, or by other sensors. Furthermore, in case of danger it is possible to activate the closing and locking functions of the security passage to thereby actively fight intruders. A simple example of such a security passage is a so-called vestibule in buildings. Such a vestibule comprises two conventional hinged doors, one at each end, that can be locked so that a person in the space between the doors is trapped, so to speak. Such doors, however require a certain space for their installation and for the spacing between the doors. Such a space is normally not available in passenger conveyances, particularly in a passenger aircraft.

Other conventional safety passages are equipped with sliding doors for closing or sealing off substantial surface areas. Moreover, when such doors need to open or close, each door needs to be controlled individually and requires extra space for its retraction. For the purposes of the invention, it would be necessary to reinforce the sliding doors to protect the large sliding door surfaces against destructive impacts, for example by bullets, and they must be fire resistant. These requirements call for respective reinforcements which in connection with sliding doors result in substantial weight increases. Moreover, the individual automatic control of the operation of the sliding doors and the enforcement of a synchronism in the door motions require a relatively expensive control system, not to mention the weight problem.

A further passage concept uses a revolving door which is primarily effective as a heat-saving closure device that separates a space inside a building from the outside atmosphere. Additionally, or simultaneously, such revolving doors depend for their operation on the force applied by the user, whereby these doors revolve best when people entering the building and people exiting from the building pass through the revolving door simultaneously. Such revolving doors have a circular cross-section and are divided into individual sectors that extend radially outwardly from a central rotational axis. The sectors together form a revolving cylinder. The cylinder side walls are sealed by brushes or flexible moldings which separate the outside atmosphere from the air in the space to which the revolving door provides access. The just described construction of revolving doors requires a substantial space which normally militates against the installation of such revolving doors in a vehicle. Additionally, it is not necessarily assured that a revolving door provides the required pressure tightness. Such pressure tightness, however, is a requirement for the above-mentioned closing of a space in a sealed manner. Such sealing is necessary, for example to introduce into the space of the revolving door an incapacitating gas in order to actively eliminate the danger, while simultaneously avoiding introducing such gas into neighboring spaces such as the cockpit or the passenger cabin or any other passenger and/or crew accommodation.

U.S. Pat. No. 6,470,512 B1 (Lau et al.) discloses a revolving door used in an aircraft to control the access to a single shower cabin from at least two dressing cabins. Security features are not involved in the disclosure of the just mentioned U. S. Patent other than privacy considerations.

OBJECTS OF THE INVENTION

In view of the foregoing it is the aim of the invention to achieve the following objects singly or in combination:

to construct a security system for controlling the access to a cockpit in such a way that unauthorized persons are prevented from entering into the cockpit and can be trapped in a revolving door also referred to as a rotatable door;

to construct a security passage for access and exit from a cockpit in such a way that not only security and safety requirements are satisfied, but other aircraft requirements are also satisfied, such as the use of a minimal space, the need for a minimal surface area, and a simple construction assuring a minimal weight;

the passageway through the revolving or rotatable door must be pressure-tight; and such a security passage must also provide at least two, preferably several, ingress and exit possibilities so that, for example, the access to the cockpit and to one or more crew quarters can be controlled.

SUMMARY OF THE INVENTION

The above objects have been achieved according to the invention by an apparatus for controlling the ingress and egress to an access restricted compartment such as a cockpit, said apparatus comprising an access area including a floor, a gate frame mounted in a fixed position in said access area, a revolving gate mounted to said floor in said gate frame for rotation about a longitudinal gate axis, said gate frame comprising at least two frame openings, said revolving gate having a single gate opening for alignment with but one of said at least two frame openings at a time for ingress and egress into and out of said rotatable gate, means permitting rotation of said revolving gate relative to said gate frame in angular steps, and controllable stop means for arresting said revolving gate in an aligned position with one of said at least two frame openings, whereby ingress and egress to and from said revolving gate is possible, or in a non-aligned position for preventing an unauthorized exit from the revolving gate.

The controllable stop means preferably include automatic spring loaded stops for the aligned position and manually controlled, electrically or magnetically operated stops for the non-aligned position. The operating button or buttons for the manual control are preferably located in the cockpit.

The present revolving gate has the advantage that its geometry is adapted to a space saving construction that can be installed in an access area to an aircraft cockpit or other restricted compartment in a passenger conveyance. Additionally, such a revolving gate, particularly in cooperation with respective doors, provides an effective defense zone against intruders. Another advantage of the present revolving gate is seen in that in a danger situation the enclosed space in the rotatable gate can be evacuated and/or an incapacitating agent such as tear gas can be injected or the air supply can be closed off, thereby actively defending against an intruder. It is particularly advantageous that the revolving gate can be sealed in such a way that adjacent spaces such as the cockpit itself or the passenger cabin or crew quarters are sealed off from the revolving gate.

BRIEF DESCRIPTION OF THE DRAWINGS

In order that the invention may be clearly understood, it will now be described in connection with example embodiments, with reference to the accompanying drawings, wherein:

FIG. 1A shows a perspective view of a revolving or rotatable gate in the form of a cylinder that fits rotatably into the gate frame of FIG. 1 and has a single ingress and egress opening;

FIG. 4 shows a schematic plan view of the cockpit area of a passenger aircraft with a revolving gate according to the invention installed in an access area;

FIGS. 4A, 4B and 4C show the various positions that the revolving gate according to the invention can assume relative to adjacent areas;

DETAILED DESCRIPTION OF A PREFERRED EXAMPLE EMBODIMENT AND OF THE BEST MODE OF THE INVENTION

Figure 1:
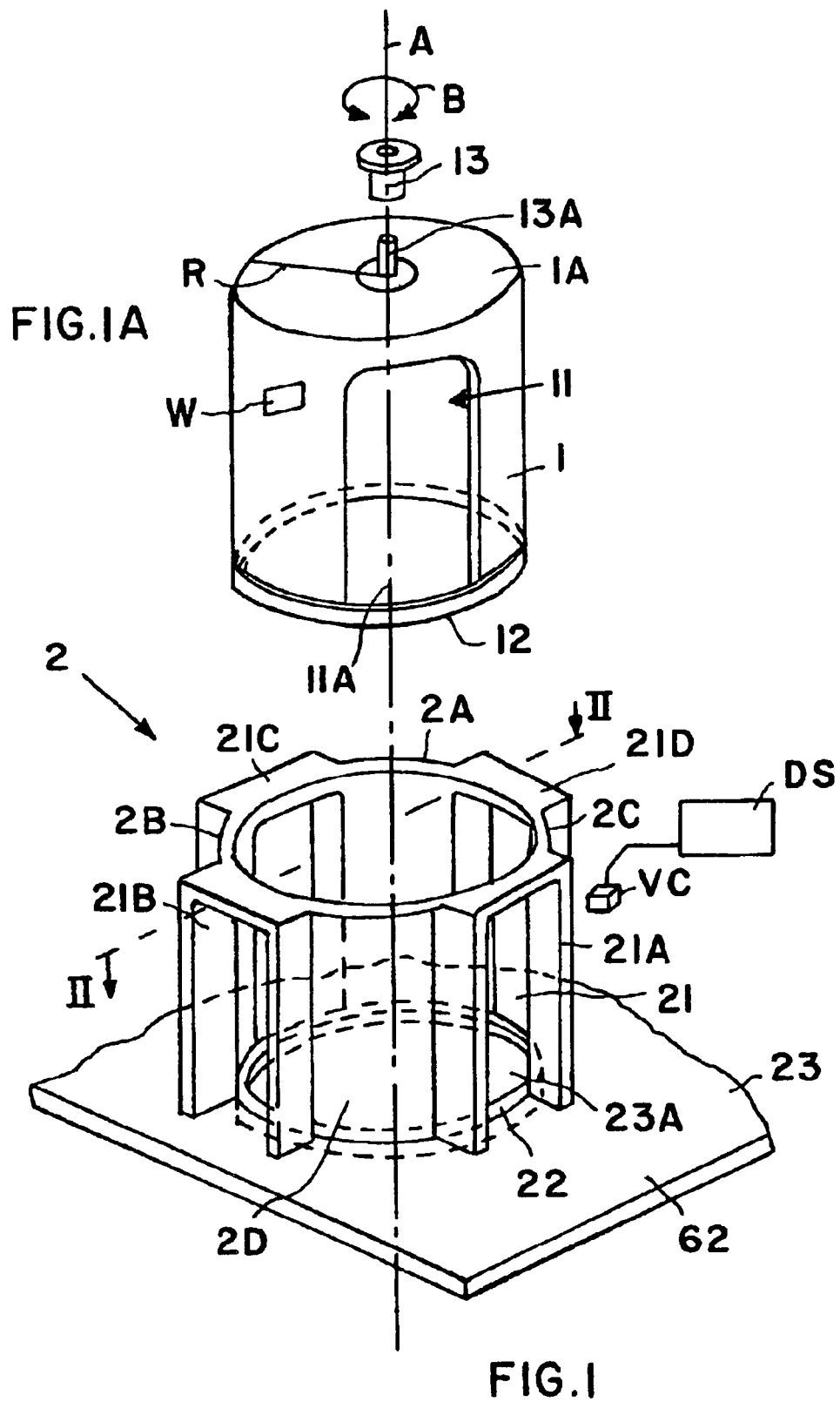
FIG. 1 shows a gate frame according to the invention with four ingress and egress sections, each section having an opening.
Figure 2:
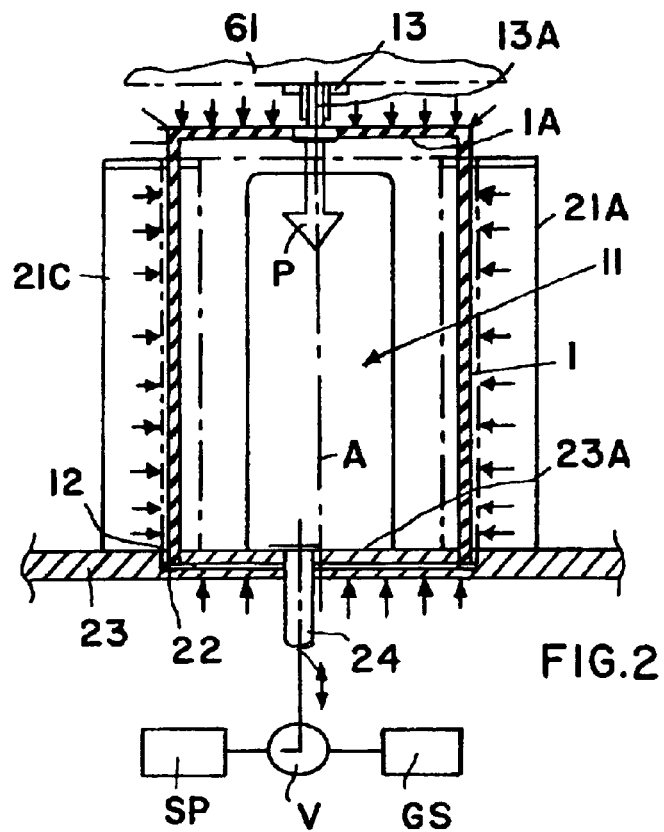
FIG. 2 shows a sectional view of the revolving gate inserted into the gate frame with the section plane extending vertically along arrows II—II in FIG. 1 and along a central, longitudinal rotational axis of the revolving gate.

FIGS. 1 and 1A illustrate the basic concept of an apparatus for controlling the ingress and egress to a cockpit 3. The apparatus according to the invention comprises a cylindrical revolving or rotatable gate 1 having a single opening 11 for entering and exiting the revolving gate 1. Otherwise, the revolving or rotatable gate 1 is completely enclosed. The lower gate end is closed by a stationary bottom or base plate 23A forming part of a floor 23 of an access area 62 that may be part of an aisle. The downwardly facing rim of the cylindrical revolving gate 1 is surrounded by a ring profile or ring section 12. The revolving gate 1 is inserted with its rim into a stationary gate frame 2 which in FIG. 1 has, for example, four ingress and egress frame sections 21A, 21B, 21C and 21D. Each frame section forms an opening 21. The gate frame 2 is secured to a base or floor plate 23 in the access area 22. The ring profile 12 surrounding the lower ring of the revolving gate 1 is operatively and slidably supported in a ring groove 22 the base plate 23. A closed top 1A of the revolving gate 1 comprises a centrally positioned journal pin 13A that cooperates with a journal bearing 13 mounted in a supporting ceiling structure 61 shown in FIG. 2. Thus, the revolving gate 1 is revolvable about a longitudinal central vertical axis A clockwise or counterclockwise as indicated by the arrow B in FIG. 1A. As shown in FIG. 2, the journal bearing 13 is preferably rigidly mounted in the ceiling structure 61 of a passenger cabin 6 shown schematically in FIG. 4. However the rotatable mounting may be reversed with journal pin 13A secured to the ceiling structure 61 and the journal bearing 13 secured to the top 1A of the revolving gate.

Figures 6, 6A:
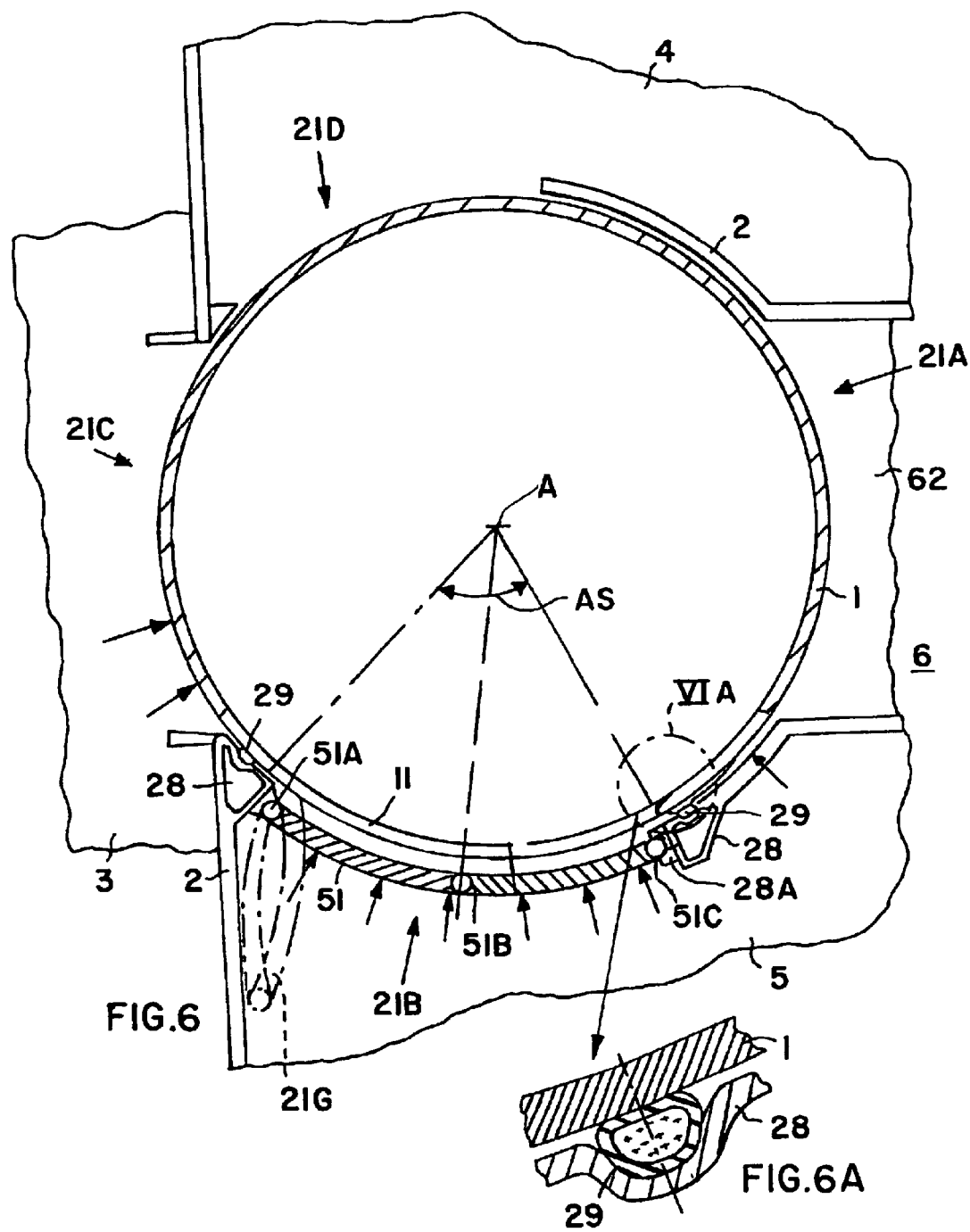
FIG. 6 shows a sectional view through the present revolving gate with part of the gate frame broken away and illustrating a door and sealing arrangement for hermetically closing and sealing the revolving gate in a pressure-tight manner.
FIG. 6A illustrates an enlargement of the portion VIA in FIG. 6.

The gate function is achieved by rotating the gate opening 11 into alignment with any one of the four openings 21, at a time, in the gate frame 2. Since the revolving gate 1 has only one opening 11, three of the four openings 21 in the gate frame 2 remain closed by the cylindrical wall of the gate 1, when the opening 11 is positioned in alignment with any one at the time of the four openings 21. The controls for permitting rotation of the gate are preferably located in the cockpit 3. Any one who seeks access or wants to exit from the gate 1 is monitored either through a bulletproof window W that can be observed from the cockpit 3 or through a video camera VC and display screen DS. The display screen is also preferably positioned in the cockpit 3 to assure that only an authorized crew member can control the rotation, the alignment of openings, or the prevention of such alignment and stopping of the revolving gate, in a closed position, whereby the closure is accomplished by a wall section 2A, 2B, 2C or 2D of the gate frame 2 or by a door 51 as shown in FIG. 6. Thus, it can be made certain who is currently present in the gate 1 or who wants to enter or exit from the gate 1. Once it is clear that an authorized person is present in the gate 1, a control signal is provided to permit rotation, e. g. manual rotation of the gate, or the control signal is applied to the drive mechanism of the gate 1, as will be described in more detail below. The drive mechanism will rotate until the opening 11 is aligned with a desired opening 21 through which the person can leave the revolving gate 1.

Due to the circular cross-section of the gate 1 to form a cylindrical enclosure, it is possible to minimize the volume or surface area size of the gate 1 by making the radius R as small as possible for the intended purpose. Accommodating but one person at a time in the gate is preferred. As a result, the quantity of bulletproof material that lines the interior of the gate 1 can be minimized. Preferably, the entire gate 1 is made of high strength bulletproof material which, nevertheless, meets the weight requirements that are always present in the lightweight aircraft construction. For example, the gate 1 can be made of polyamide fabric which is known under the tradename CETEX HPPE (made by Ten Cate in the Netherlands). Due to the advantageous geometry of a cylindrical configuration with a circular cross-section it is possible to install the gate 1 in a minimum of space. FIG. 4 illustrates such an installation in a gate area 62 between a cockpit 3 and a passenger cabin space 6.

FIG. 2 illustrates by small arrows how the revolving gate 1 is exposed to the cabin pressure when the gate construction is sealed in a pressure-tight manner to thereby separate the atmosphere within the revolving gate 1 from the atmosphere in the passenger cabin 6 and in the cockpit 3. Thus, it is possible to evacuate the gate 1 through a suction pipe or hose or conduct 24 when the opening 11 is not aligned with any one of the openings 21. In a commercial aircraft it is possible to connect the evacuation pipe or hose 21 to a decompression flap, whereby the interior of the gate 1 would be exposed to a decompression pressure. Alternatively, it is possible to connect the interior of the gate 1 directly to the atmosphere during flight. Thus, it is possible to incapacitate an unauthorized intruder by a temporary air withdrawal or rather by the resulting lack of oxygen. Similarly, the conduit or pipe 24 can be used to equalize the pressure in the gate 1 in case an explosive has been ignited in the gate 1. As an alternative, the hose 24 may be connected to an evacuation pump SP through a valve V or to a supply GS of an incapacitating gas.

Figure 5A:
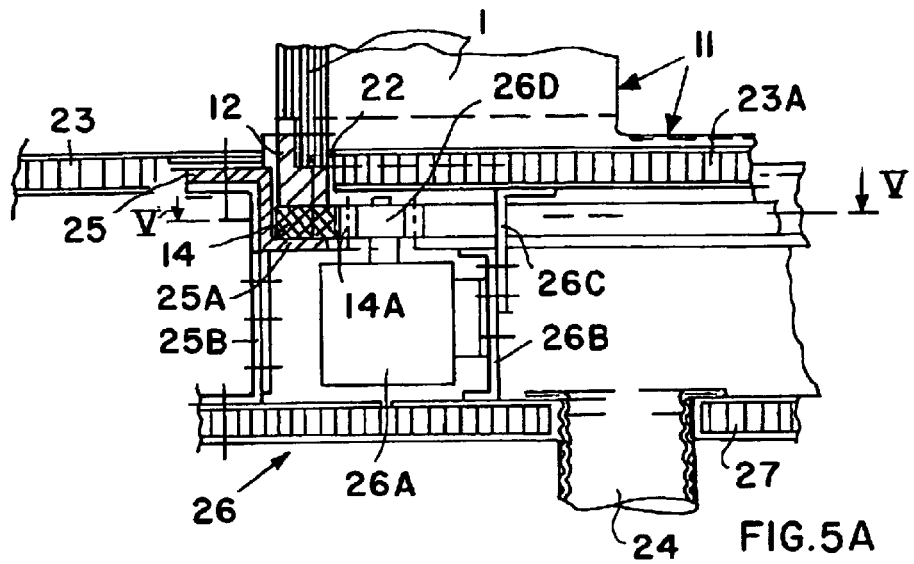
FIG. 5A shows a sectional view along section line VA—VA in FIG. 5.

Referring further to FIG. 2, the pressure P that is effective on the outer surface of the top cover 1A of the revolving gate 1 presses the ring profile or section 12 into the groove 22 of the base plate 23 so that a sufficient pressure-tightness is achieved in this area. FIGS. 5A and 6 show details of the pressure seals between the interior and the exterior of the revolving gate. It has been found to be sufficient to provide the sealing features only where the revolving gate is in a fixed position or in a defined sector where the opening 11 in the gate 1 is in alignment with an opening 21 in the gate frame 2. Only when the gate 1 is in such a fixed position is it necessary to activate the exhaust pipe or conduit 24. Due to the compression force P, the gate 1 is further sealed in a sliding manner in the groove 22 of the base plate or bottom 23A. However, at least one stop acts against any further rotation of the gate 1 relative to the frame 2 to stop in an appropriate sector AS shown in FIG. 6. With regard to exposing the gate 1 to an external pressure or to an increased internal excess pressure, the cylindrical shape has the advantage of a strength that withstands the required pressure differentials even if the cylinder forming the revolving gate 1 is of lightweight construction.

It is possible to construct the base plate 23A as a floor of the gate 1, whereby the top journal bearing 13 can be replaced by a respective bottom bearing or by roller bearings between the floor of the cabin and the gate floor 23A. If the base plate 23A becomes the floor of the gate 1, the drive requires somewhat more power because a person in the gate would rotate with the gate.

Figure 3:
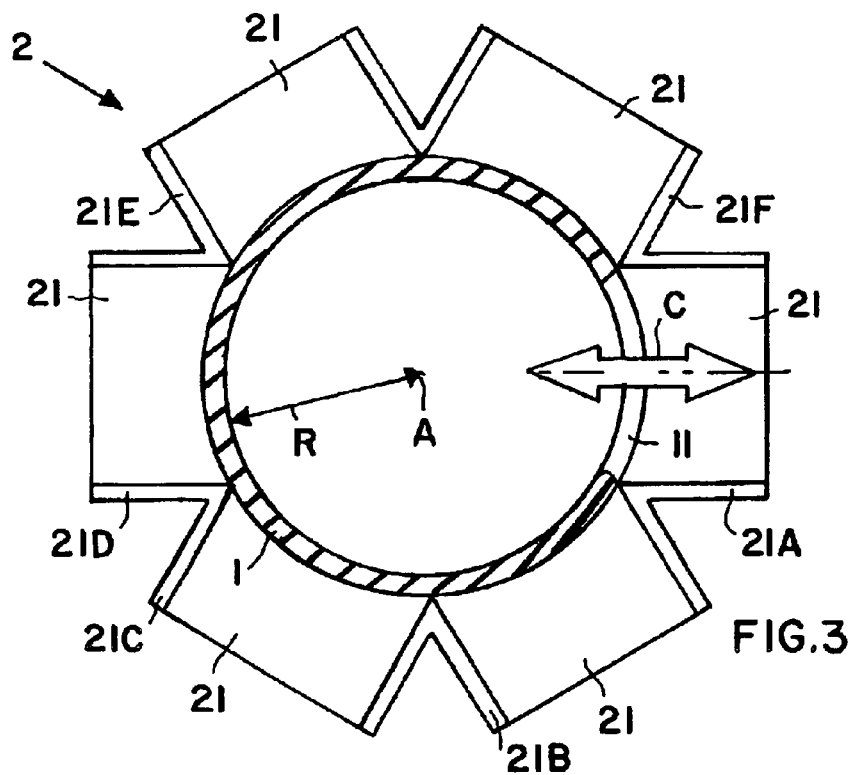
FIG. 3 shows a plan view of another embodiment of a revolving gate with a gate frame providing six ingress and egress sectors with respective openings.

The plan view of FIG. 3 shows how, depending on the diameter or radius R of the gate 1, the latter is capable of cooperating with more than two openings 21, for example, six such openings 21. Each of these openings 21 in the frame structure 2 are formed by respective frame sections 21A, 21B, 21C, 21D, 21E and 21F of identical construction. The symmetrical construction with 60° sectors shown in FIG. 3 is not a necessity. In other words, the angular spacings between neighboring openings 21 can differ from opening pair to opening pair. Further, less than six, for example four openings, may be provided as shown in FIG. 4. This flexibility is advantageous in designing the layout of the present gate to adapt the gate structure to the given space in any particular type of vehicle. As shown in FIG. 3, one of the six openings 21 is currently in alignment with the opening 11 in the shown position of the gate 1 as indicated by the arrow C.

FIG. 4 shows a schematic plan view of a commercial aircraft nose section illustrating the cockpit 3, a portion of the passenger cabin 6, a crew resting compartment 4, and toilet facilities 5. Arranging the crew's resting compartment 4 and the toilet 5 between the cockpit 3 and the passenger cabin 6 provides a gate area 62 in which the revolving gate 1 is installed. In the position of the gate 1 shown in FIG. 4 there is currently access into the gate as indicated by the arrow C from the passenger cabin 6. A person T is on her/his way into the gate 1. The gate 1 has a diameter of about 75 cm, for example, which makes its installation in the gate area 62 quite feasible and the required security function can be satisfied.

The operation or function will now be described with reference to FIGS. 4A, 4B and 4C. As shown in FIG. 4A, the gate 1 has been rotated so that a person can now exit from the gate 1 into the cockpit 3 as indicated by the arrow D. The position of FIG. 4A can be reached by rotating the gate 1 either clockwise or counterclockwise.

FIG. 4B shows by the arrow E that the opening 11 is now aligned with an entrance into the toilet 5. This position is preferably achieved by rotating the gate 1 for 90° in the clockwise direction so that the opening 11 does not need to pass by an opening 21 into the crew compartment 4, nor an opening 21 into the cockpit 3.

FIG. 4C shows an alignment of the opening 11 with an opening 21 into the crew compartment 4 as indicated by the arrow F. This alignment is achieved by rotating the gate 1 counterclockwise for 90°, or approximately 90°, whereby again the opening 11 does not need to pass any other openings 21. FIG. 4C also shows that the opening 21 into the compartment 4 extends over a smaller sector angle relative to the y-direction as indicated by the arrow F. This feature facilitates the coordination of the gate to the other structural requirements of the aircraft, such as the position and size of the compartment 4. Further, this arrangement facilitates the control of the access to the crew compartment 4 or to the toilet 5 in addition to controlling the access to the cockpit 3. The shown coordination also improves the comfort for crew members by providing more space for dressing and undressing as well as space for performing some tension release exercises or for providing some privacy, however short, for a crew member.

Figure 5:
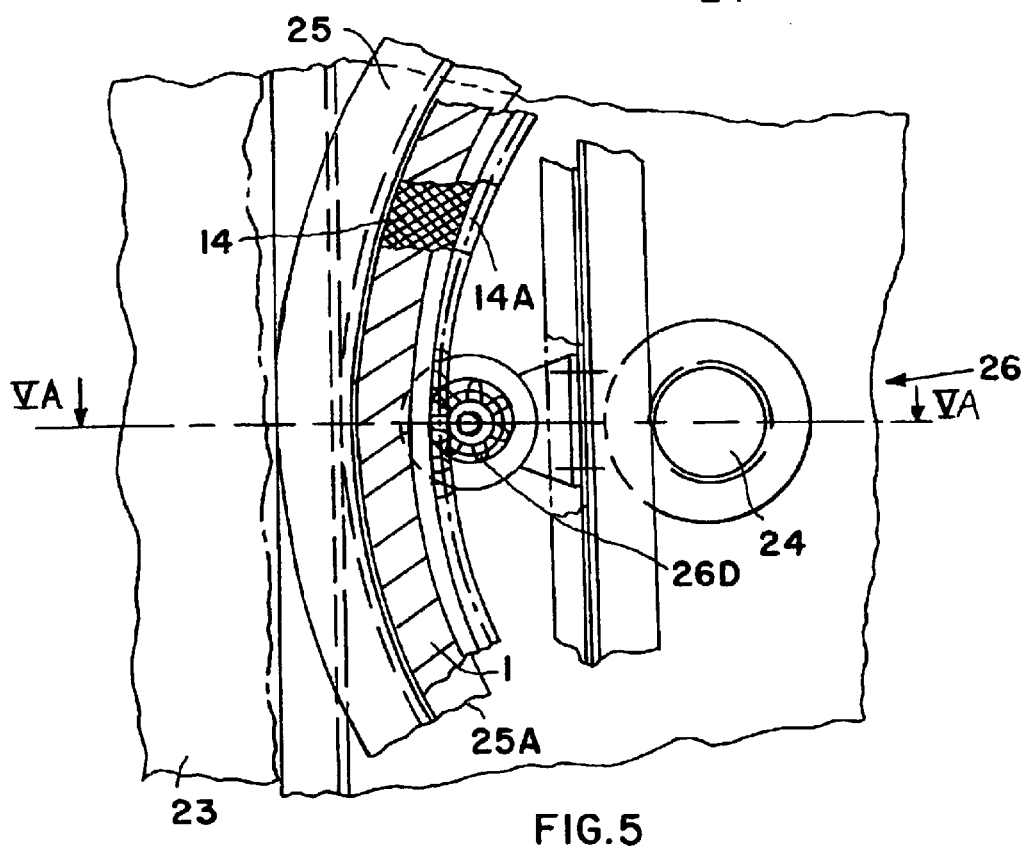
FIG. 5 shows a plan view onto a plane V—V in FIG. 5A of a drive mechanism for the present revolving gate partially broken away.

FIGS. 5 and 5A show a plan view and a sectional view of a drive mechanism 26 for the present revolving gate 1. It will be noted that the ring section or profile 12 that surrounds the bottom rim of the gate 1 is connected to a sliding body 14 made, for example, of high strength synthetic material. The sliding body 14 forms a slide ring 14 that permits rotation of the gate 1 in a groove or gap 22 in the floor 23 around the floor plate 23A. The slide ring 14 is supported on a horizontal ring portion 25A of a groove profile 25 mounted to a support member 25B which in turn rests on a floor bulkhead 27. The bulkhead 27 provides support and a hermetically sealed construction.

In the embodiment shown in FIG. 5A an electric motor 26A is mounted to support element 26B which in turn is secured to the bulkhead 27. The support element 26B also carries a further support element 26C which supports the stationary floor plate or bottom 23A of the gate 1. The gate ring section 12 surrounding the lower edge of the gate 1 can move with the sliding body 14 along the support 25 in the circular gap 22 formed between the floor plate 23A and the floor 23 as mentioned above. The support 25 may also be made of a sliding improving material in the form of a profile or section having approximately a Z-cross-sectional configuration as seen in the upper left-hand portion of FIG. 5A. The sliding body 14 is equipped with a radially inwardly facing gear ring 14A which meshes with a pinion gear 26D driven by the electric motor 26A. The pinion gear 26D meshes with the inner gear ring 14A for driving the gate 1 in response to a control signal or signals supplied to the electric motor 26A, preferably from controls in the cockpit 3. Once the gate 1 has reached the desired rotated position, it can be locked in place, for example by electrically or magnetically operated locking bolts. The control signal for the electric motor 26A can be generated by operating a switch that is accessible only to authorized personnel such as a member of the crew in the cockpit. The same applies to the control of the locking bolts that can snap into a recess in the gate 1 when the gate needs to be stopped. The just described driving system is simple and robust with the added advantage that due to the large transmission ratio between the inner gear ring 14A and the pinion gear 26D an intermediate gear box is avoided thereby saving weight.

Other drive systems for the gate 1 are possible. For example, the gate 1 may be manually operated, preferably following an unlocking signal from an authorized person. Such unlocking signal may cause the withdrawal of one or more locking bolts from their engagement with any of the components of the gate 1. The locking-bolt or bolts may for example be operated by an electric solenoid that responds to a respective control signal generated in the cockpit. It is necessary, that the locking and unlocking control signals can be generated only by authorized personnel.

Rather than mounting the drive system below the gate 1, as shown in FIGS. 5 and 5A, it is alternatively possible to install a drive system in the area of the journal bearing 13 above the gate 1. In both instances the floor plate 23 may be either stationary as shown in FIG. 5A or rotatable with the gate 1 as mentioned above. Further, the gear drive may be replaced by a belt drive using a flat belt or a gear belt or a V-belt or a friction roller drive or the like. Even a chain drive might be feasible, weight conditions permitting.

The above mentioned hermetic sealing of the interior of the gate 1 is facilitated by the extended pressure shown by an arrow P and little arrows in FIG. 2. This pressure tends to press the sliding body or ring 14 against the support 25 specifically against the horizontal portion 25A of the support ring 25. The groove 22 assures an improved guiding of the rotation movement of the revolving gate 1. Additionally, the sealing is facilitated by the pressure-tight bulkhead 27 shown in FIG. 5A below the floor 23. The opening 11 in the gate 1 is further sealed by a seal 29 to be described in more detail below with reference to FIG. 6. The seal 29 is installed in the frame structure in a fixed position and extends around the edge of the opening 11 when the gate 1 is in an alignment position with an opening 21. Thus, the evacuation of the interior of the gate 1 through the air duct or pipe 24 is made possible.

In order to provide an effective defense against intruders into a restricted area in an aircraft, it is further advantageous to introduce, alternatively or additionally to cutting off the air supply or to diminishing the oxygen content in the gate 1, for example by a pressure equalization with the outer atmosphere, anaesthesia causing or incapacitating agents such as tear gas and similar agents. The supply or store of the anaesthesia causing or incapacitating agents is preferably kept in the secure container GS in the cockpit 3 in order to assure the use of these agents only by authorized personnel. The introduction into the gate 1 of these agents can take place through nozzles in the ceiling and/or floor area or through air conditioning ducts or through the pipe 24. The above outlined features that to seal the gate 1 from the adjacent compartment areas such as the cockpit 3, the crew quarters 4, the toilet 5, and the passenger cabin 6, will be applied in combination with the features to be described below with reference to FIGS. 6 and 6A. As mentioned, the sliding body or ring 14 is pressed against the horizontal ring portion 25A of the profile 25 which together with the sealing bulkhead 27, provides a complete sealing of the lower gate area where the drive 26 is mounted.

FIGS. 6 and 6A illustrate the hermetic sealing of the gate 1 and its opening 11 relative to an opening 21 in the frame 2. When the gate 1 is in a position in which the opening 11 is aligned with an opening 21, the gate 1 is locked. The frame 2 is equipped with a molding 28 that surrounds the opening 21 facing the opening 11 as best seen in FIG. 6. Referring to FIG. 6A, the molding 28 encloses a pressurized flexible hose 29 that is in contact with the surface area of the body of the gate 1 all around the opening 11. In this position the hose 29 is pressurized and the air evacuation can immediately start.

Additionally, the toilet space 5 is closeable with a pressure-tight door 51 that is hinged by a hinge 51A to the frame 2 preferably to the molding 28. The cabin pressure indicated by a plurality of arrows is effective to press the door 51 toward the opening 11 as the pressure inside the gate 1 is reduced. The dashed line illustration shows the door 51 in an open position. The door 51 may be constructed as a folding door with a hinge 51B between two foldable panels. The right-hand edge 51C of the door 51 engages in its closed position a respective molding section 28A in a pressure-tight manner. The pressure difference indicated by the small arrows tends to press the edge 51C of the door panel into the molding section 28A. This advantageous feature helps reduce the weight of the door construction even if substantial pressure forces are effective, because the reaction forces are taken up by the stationary molding of the frame 2 and not by the revolving gate 1. Thus, for the evacuation of the space within the gate 1 and for introducing anaesthesia or other incapacitating agents, the gate 1 must be positioned into cooperation with the sealed door 51. However, it is not necessary to equip the opening of the crew compartment 4 and of the cockpit 3 with such a sealed door, which has the advantage that costs and weight are saved, because a curtain can provide the required privacy in the crew compartment. Escape into the crew compartment is prevented since the alignment of the single opening 11 with the opening 21 into the crew compartment 4 is not controllable by an unauthorized person in the revolving gate 1.

It is possible to rotate the opening 11 of the gate 1 into cooperation with a wall portion 2A, 2B, 2C or 2D of the frame 2 shown in FIG. 1 between ingress and egress openings 21 so that a very small angular rotation is sufficient to bring the gate 1 into a position for trapping an intruder in the revolving gate 1. This possibility is particularly readily available if there are not more than four openings 21 in the frame 2. In this connection it is advantageous to provide the frame structure or rather the wall of the frame structure facing the outward facing wall of the gate 1 with a respective sealing device such as shown in FIG. 6A.

Rather than positioning the seals 29 in moldings 28 of the stationary frame structure 2, it is possible to attach elastic seals around the opening 11 for cooperation with the walls of the frame structure, whereby it is necessary to make certain that the interior of the gate 1 is completely sealed from the crew quarters 4, the cockpit 3, and the toilet 5. In any embodiment the evacuation through the air duct or pipe 24 may not be necessary. Anaesthesia or incapacitating agents may be introduced into the revolving gate 1 through the pipe 24 or through a similarly positioned inlet in the ceiling 1A. In such an embodiment it is necessary to prevent an air exchange between the interior of the revolving gate 1 and all of the spaces 3, 4, 5 and 6 to effectively prevent the entrance of anaesthesia or incapacitating agents into any of the spaces outside the space confined inside the revolving gate 1 so that the crew and passengers are not endangered.

Referring particularly to FIGS. 2 and 5A in conjunction, the lower end structure of the revolving gate 1 could be arranged at the ceiling 1A of the bell-shaped cylindrical configuration of the revolving gate 1, while the upper end structure could be arranged at the bottom of the revolving gate 1. More specifically, the gate cylinder could have a bottom that rotates with the gate 1 and the journal bearing 13, 13A would be arranged between this bottom and a fixed floor structure. All the floor mounted components including the drive motor 26A and the gears 26D and 14A would then be arranged above the ceiling 1A or around the ceiling 1A.

Such a reversal of the top and bottom components would result in an equivalent function because it does not make any difference whether the air exhaust and/or incapacitating gas introduction, e.g. through the conduit 26, takes place from the bottom or from the top. The result is the same.

When the gate drive for rotating the revolving-gate 1 as shown in FIGS. 5 and 5A at the bottom or lower end of the cylindrical bell-shaped revolving gate 1 is arranged at the top of the revolving gate, the space and sealing requirements are also the same. For example a gear ring having gear teeth facing upwardly could be secured to the top of the ceiling 1A shown in FIG. 2. In that case, the drive motor 26 would be positioned with its drive shaft extending horizontally so that the pinion 26D rigidly secured to the motor's drive shaft could engage the upwardly facing gear teeth. Similarly, and equivalently, the gear ring could be secured to the wall of the revolving gate above the gate opening 11 and the motor 26A with its pinion would be mounted to extend vertically with its drive shaft. The same considerations apply to any other type of drive mentioned above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for controlling ingress and egress to and from a restricted compartment (3), said apparatus comprising an access area including a floor, a stationary gate frame (2) mounted in a fixed position on said floor in said access area, a rotatable gate (1) rotatably mounted in said stationary gate frame for rotation about a longitudinal gate axis (A), said gate frame (2) comprising at least two frame openings (21), said rotatable gate (1) comprising a single gate opening (11), means for permitting rotation of said rotatable gate (1) relative to said gate frame (2) for selectively aligning said single gate opening (11) with only one of said at least two frame openings (21) at a time for ingress and egress into and out of said rotatable gate (1), and external control means outside of said rotatable gate for arresting said rotatable gate in a gate closing position in which said single gate opening faces any one of a closed door and a wall portion of said stationary gate frame for preventing an unauthorized exit from said rotatable gate (1), wherein said rotatable gate is a hollow cylinder having a cylinder wall, a top (1A), a bottom (23A) and a cut-out in said cylinder wall forming said single opening (11) for ingress into and egress from said rotatable gate (1).

2. The apparatus of claim 1, wherein said at least two frame openings (21) comprise a first frame opening for providing a connection between a passenger area (6) and said rotatable gate (1), a second frame opening for providing a connection between said restricted compartment (3) and said rotatable gate (1), and a third frame opening (21B) for providing a connection between at least one further restricted area (4, 5) and said rotatable gate (1).

3. The apparatus of claim 2, wherein said at least one further restricted area is one of a toilet (5) and a crew compartment (4).

4. The apparatus of claim 1, wherein said at least two frame openings are uniformly angularly spaced from each other at equal on-center angles around said longitudinal gate axis (A), whereby said at least two frame openings are arranged opposite each other.

5. The apparatus of claim 1, wherein said at least two frame openings are angularly spaced from each other at unequal on-center angles around said longitudinal gate axis (A), whereby said at least two frame openings are not arranged opposite each other.

6. The apparatus of claim 1, wherein said means for permitting rotation comprise a drive mechanism including a drive motor, a pinion fixed to a drive shaft of said drive motor and a gear ring secured to an upper end of said rotatable gate (1) and meshing with said pinion to rotate said rotatable gate.

7. The apparatus of claim 1, wherein said means for permitting rotation comprise a drive mechanism for rotating said rotatable gate (1), said drive mechanism comprising a drive motor having a power output shaft and driving force transmission means operatively interposed between said power output shaft and said rotatable gate (1).

8. The apparatus of claim 7, wherein said driving force transmission means comprise drive elements selected from any one of friction roller drives, belt drives, and chain drives.

9. The apparatus of claim 1, wherein said external control means comprise a controllable stop including at least one locking bolt positioned for arresting said rotatable gate (1) in any one of a plurality of positions, and a control member for operating said locking bolt electrically or by remote control.

10. An apparatus for controlling ingress and egress to and from a restricted compartment (3), said apparatus comprising an access area including a floor, a stationary gate frame (2) mounted in a fixed position on said floor in said access area, a rotatable gate (1) rotatably mounted in said stationary gate frame for rotation about a longitudinal gate axis (A), said gate frame (2) comprising at least two frame openings (21), said rotatable gate (1) comprising a single gate opening (11), means for permitting rotation of said rotatable gate (1) relative to said gate frame (2) for selectively aligning said single gate opening (11) with only one of said at least two frame openings (21) at a time for ingress and egress into and out of said rotatable gate (1), and external control means outside of said rotatable gate for arresting said rotatable gate in a gate closing position in which said single gate opening faces any one of a closed door and a wall portion of said stationary gate frame for preventing an unauthorized exit from said rotatable gate (1), wherein said rotatable gate (1) has a cylindrical bell configuration with a circular cross-section and a closed top (1A), and wherein said means for permitting rotation of said rotatable gate (1) comprise at least one journal bearing (13) mounted to a fixed component in alignment with said longitudinal gate axis (A) and operatively connected to said cylindrical bell configuration of said rotatable gate (1).

11. The apparatus of claim 10, wherein said cylindrical bell configuration of said rotatable gate (1) has an open bottom surrounded by a bottom rim, and further comprising a stationary base plate (23A), a circular groove (22) in said stationary base plate (23A) for guiding said bottom rim, a slide ring (14) secured to said bottom rim below said groove (22) for slidably supporting said rotatable gate (1), and a support (25A) for supporting said slide ring (14), and wherein said means for permitting rotation comprise a gate drive including a drive motor (26A) and a gear (14A, 26D) operatively interposed between said drive motor (26A) and said rotatable gate (1).

12. The apparatus of claim 11, wherein said gear comprises a gear ring (14A) secured to said slide ring (14), said gear ring (14A) having radially inwardly facing gear teeth, said gear further comprising a pinion (26D) fixed to an output shaft of said drive motor (26A) and meshing with said gear ring (14A) to rotate said rotatable gate (1).

13. An apparatus for controlling ingress and egress to and from a restricted compartment (3), said apparatus comprising an access area including a floor, a stationary gate frame (2) mounted in a fixed position on said floor in said access area, a rotatable gate (1) rotatably mounted in said stationary gate frame for rotation about a longitudinal pate axis (A), said gate frame (2) comprising at least two frame openings (21), said rotatable gate (1) comprising a single gate opening (11), means for permitting rotation of said rotatable gate (1) relative to said gate frame (2) for selectively aligning said single gate opening (11) with only one of said at least two frame openings (21) at a time for ingress and egress into and out of said rotatable gate (1), and external control means outside of said rotatable gate for arresting said rotatable gate in a gate closing position in which said single pate opening faces any one of a closed door and a wall portion of said stationary gate frame for preventing an unauthorized exit from said rotatable gate (1), and further comprising an airtight seal between said rotatable gate (1) and said gate frame (2) for forming a hermetically sealed space inside said rotatable gate (1) when said rotatable gate is in a closed position, and a flow controlling duct (24) leading into said hermetically sealed space in said rotatable gate (1).

14. The apparatus of claim 13, wherein said airtight seal comprises a supporting floor structure (23), a ring groove (22) in said supporting floor structure (23), said rotatable gate (1) having a bottom edge (12) reaching through said ring groove (22), a support (25A) below said ring groove, said bottom edge resting on said support (25A) in a sealed manner when said hermetically sealed space is evacuated, a sealed enclosure (27) surrounding a space below said ring groove (22), at least one pressure sealed door (51) in said gate frame (2), and a pressurizable hose (29) extending around said gate opening (11).

15. The apparatus of claim 13, further comprising a suction pump (SP) connectable to said flow controlling duct (24) for evacuating said hermetically sealed space in said rotatable gate (1).

16. The apparatus of claim 13, further comprising a gas supply container (GS) holding an incapacitating gas, and a valve (V) for connecting said gas supply container to said hermetically sealed space in said rotatable gate (1).

17. An apparatus for controlling the ingress and egress to and from a restricted compartment, said apparatus comprising an access area including a floor, a gate frame (2) mounted in a fixed position on said floor in said access area, a revolving gate (1) rotatably mounted in said gate frame for rotation about a longitudinal gate axis (A), said gate frame (2) comprising at least two frame openings (21), said revolving gate comprising a single gate opening (11), means for permitting (13) rotation of said revolving gate (1) relative to said gate frame (2) for aligning said single gate opening (11) with but one of said at least two frame openings (21) at a time for ingress and egress into and out of said revolving gate, and controllable stop means for arresting said revolving gate in one of two positions including an alignment position permitting ingress to and egress from said revolving gate (1) and a gate closing position for preventing an unauthorized exit from said revolving gate (1), wherein said revolving gate has a cylindrical wall made of bulletproof material, and wherein said cylindrical wall comprises a see-through window (W) made of bulletproof and transparent material.

* * * * *

UNITED STATES PATENT AND TRADEMARK OFFICE
CERTIFICATE OF CORRECTION

PATENT NO. : 6,925,756 B2
DATED : August 9, 2005
INVENTOR(S) : Roessner et al.

It is certified that error appears in the above-identified patent and that said Letters Patent is hereby corrected as shown below:

Column 4,
Line 32, after "groove 22", insert -- of --;

Column 10,
Line 19, after "wall, a", insert -- closed --;

Column 11,
Line 46, after "longitudinal", replace "pate" by -- gate --;

Column 12,
Line 2, after "single", replace "pate" by -- gate --.

Signed and Sealed this

Third Day of January, 2006

JON W. DUDAS
*Director of the United States Patent and Trademark Office*